United States Patent
Wright

(10) Patent No.: US 10,383,310 B2
(45) Date of Patent: Aug. 20, 2019

(54) HEATED LIVESTOCK WATERER

(71) Applicant: CAP Solar Pumps Ltd., Olds (CA)

(72) Inventor: Jason Wright, Olds (CA)

(73) Assignee: CAP Solar Pumps Ltd., Olds (CA)

( * ) Notice: Subject to any disclaimer, the term of this patent is extended or adjusted under 35 U.S.C. 154(b) by 444 days.

(21) Appl. No.: 15/343,800

(22) Filed: Nov. 4, 2016

(65) Prior Publication Data

US 2017/0127649 A1 May 11, 2017

(30) Foreign Application Priority Data

Nov. 5, 2015 (CA) ...................................... 2911140

(51) Int. Cl.
*A01K 7/00* (2006.01)
*A01K 7/02* (2006.01)

(52) U.S. Cl.
CPC .................................... *A01K 7/027* (2013.01)

(58) Field of Classification Search
CPC ............. A01K 7/00; A01K 7/027; A01K 7/02
USPC .......................................... 119/72–74, 77–81
See application file for complete search history.

(56) References Cited

U.S. PATENT DOCUMENTS

| | | | |
|---|---|---|---|
| 2,501,847 A | 3/1950 | Hayter | |
| 2,509,455 A | 5/1950 | Rysdon | |
| 2,511,353 A | 6/1950 | Leaf | |
| 2,635,580 A | 4/1953 | Donahoe et al. | |
| 2,728,325 A | 12/1955 | Sturma | |
| 2,865,327 A | 12/1958 | Anderson | |
| 3,051,162 A | 8/1962 | Porter | |
| 3,186,402 A | 6/1965 | File | |
| 4,256,950 A * | 3/1981 | Wildgruber | A01K 7/027 119/73 |
| 4,708,091 A * | 11/1987 | Schafer | A01K 7/027 119/61.55 |
| 5,740,760 A * | 4/1998 | Winebrenner | A01K 7/027 119/73 |
| 5,983,889 A * | 11/1999 | Thomas | F24H 1/0054 119/73 |
| 8,651,065 B1 | 2/2014 | Eash et al. | |

FOREIGN PATENT DOCUMENTS

JP 2002-104 A 6/2006

* cited by examiner

*Primary Examiner* — Richard T Price, Jr.
(74) *Attorney, Agent, or Firm* — Christensen O'Connor Johnson Kindness PLLC

(57) ABSTRACT

There is provided a heated livestock waterer having a heater chamber, a heater disposed in the heater chamber that, in operation, generates at least heated gas, and a water reservoir having at least one sidewall that is in thermal communication with the heater chamber, the water reservoir having an animal watering section and a covered section covered by a lid, the lid and the covered section defining an air space that is in fluid communication with the heater chamber via an air passage, the air space having a vent to atmosphere.

18 Claims, 6 Drawing Sheets

HEATED LIVESTOCK WATERER

TECHNICAL FIELD

This relates to a heating system for use with a livestock waterer to provide livestock with water during cold temperature.

BACKGROUND

During winter months livestock may not have ready access to fresh water, as ice will form in water troughs and other water sources. In order to provide livestock with water during these times, heated water sources must be provided. One example of an animal watering device that is heated to prevent freezing is found in U.S. Pat. No. 2,509,455.

SUMMARY

According to an aspect, there is provided a heated livestock waterer comprising a heater chamber, a heater disposed in the heater chamber that, in operation, generates at least heated gas, and a water reservoir having at least one sidewall that is in thermal communication with the heater chamber, the water reservoir having an animal watering section and a covered section covered by a lid, the lid and the covered section defining an air space that is in fluid communication with the heater chamber via an air passage, the air space having a vent to atmosphere.

According to another aspect, the heater may be a catalytic heater and the heater chamber may further comprise an air inlet.

According to another aspect, the heated livestock waterer may further comprise a vapour hood that is directly connected to the air passage of the heater chamber, the vapour hood being positioned to collect the heated gas generated by the heater.

According to another aspect, the heated livestock waterer may further comprise a secondary heater for heating the heater chamber.

According to another aspect, the water reservoir may have a layer of insulation on an outer wall, the outer wall being separate from the at least one sidewall in thermal communication with the heater chamber.

According to another aspect, in operation, the pressure of the air space may be greater than atmospheric pressure and the pressure of the heated gas generated by the heater may be greater than the pressure of the air space.

According to another aspect, the vent may be immediately adjacent to a water level of the water reservoir.

According to another aspect, the water reservoir may have a predetermined water level and may further comprise a level sensor for maintaining the predetermined water level.

According to another aspect, at least a portion of the heated gas may be water vapour, and any water vapour that condenses in the air space may be collected in the water reservoir.

According to an aspect, there is provided a method of heating water for livestock, the method comprising providing a heated livestock waterer comprising a heater chamber, a heater disposed in the heater chamber, and a water reservoir having at least one sidewall that is in thermal communication with the heater chamber, the water reservoir having an animal watering section and a covered section covered by a lid, the lid and the covered section defining an air space that is in fluid communication with the heater chamber via an air passage, the air space having a vent to atmosphere, filling the water reservoir with water, and operating the heater to heat the at least one sidewall that is in thermal communication with the water reservoir, and to generate a heated gas that exits the heater chamber through the air passage and enters the air space, the heated gas exchanging heat with the water in the water reservoir.

According to another aspect, the heater may be a catalytic heater and the heater chamber may further comprise an air inlet.

According to another aspect, the heated livestock waterer may further comprise a vapour hood that is directly connected to the air passage of the heater chamber, and wherein the vapour hood collects the heated gas generated by the heater.

According to another aspect, the heated livestock waterer may further comprise a secondary heater for heating the heater chamber.

According to another aspect, the water reservoir may have a layer of insulation on an outer wall, the outer wall being separate from the at least one sidewall in thermal communication with the heater chamber.

According to another aspect, in operation, the pressure of the air space may be greater than atmospheric pressure and the pressure of the heated gas generated by the heater may be greater than the pressure of the air space.

According to another aspect, the vent may be immediately adjacent to a water level of the water reservoir.

According to another aspect, the water reservoir may have a predetermined water level and may further comprise a level sensor for maintaining the predetermined water level.

According to another aspect, at least a portion of the heated gas may comprise water vapour, and any water vapour that condenses in the air space may be collected in the water reservoir.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
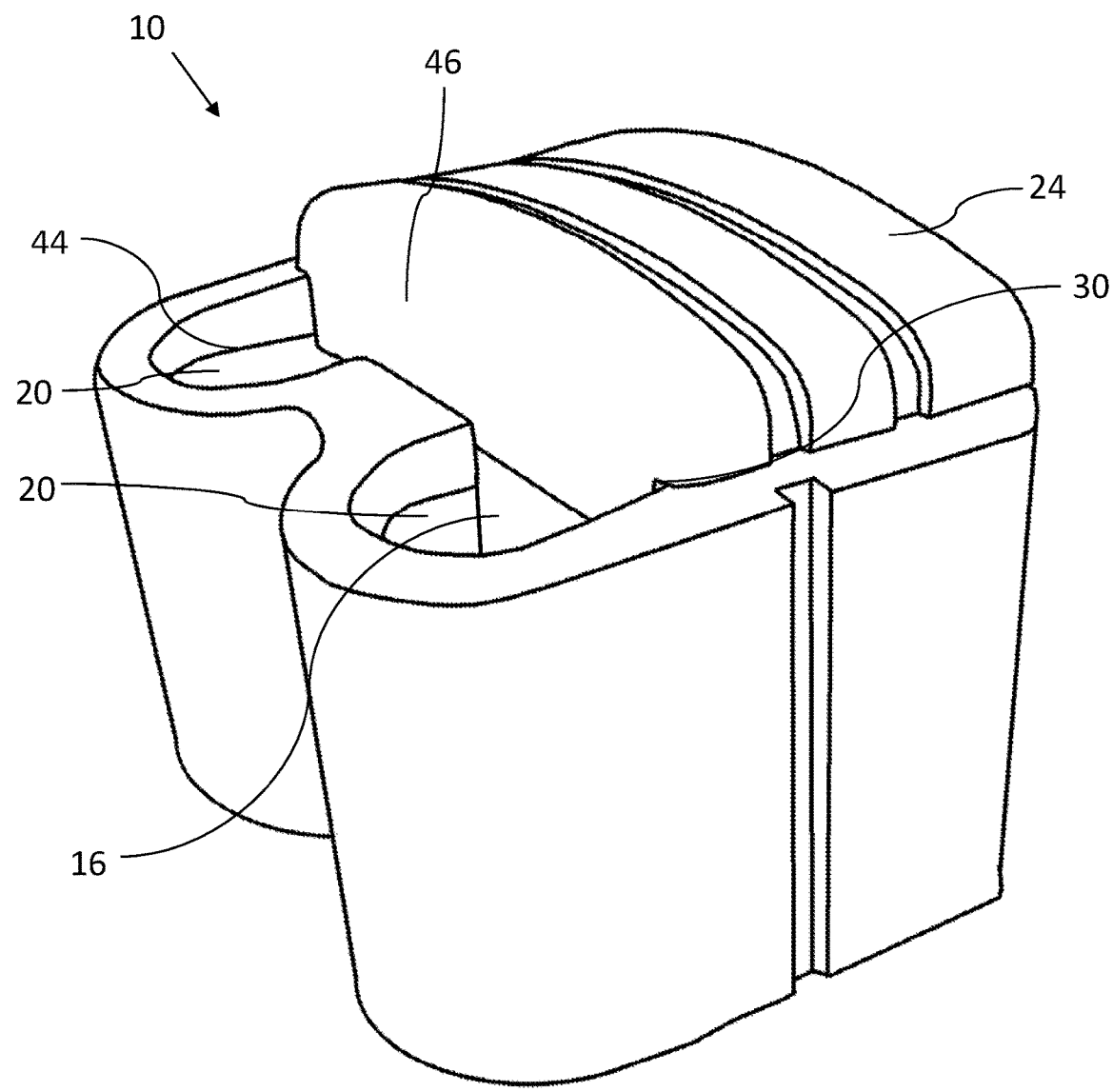
FIG. 1 is a perspective view of a heated livestock waterer.

A heated livestock waterer generally identified by reference numeral 10, will now be described with reference to FIG. 1 through 8.

Referring to FIG. 1, heated livestock waterer 10 has a water reservoir 16 and a lid 24. It will be understood that heated livestock waterer 10 may have different shapes and sizes depending on the type of livestock that requires water. For example, heated livestock waterer 10 may be used for providing water to herds of cattle. Heated livestock waterer 10 may also be used for horses, sheep, alpaca, or a variety of other livestock, and may be resized or reconfigured according to the intended use. Heated livestock waterer 10 will have an access area provided by animal watering section 20 of water reservoir 16 that is not covered by lid 24 to allow the animals to drink. By heating the water in water reservoir 16, this access area remains unfrozen, and at a temperature that is required to have the livestock drink from water reservoir 16. It will be understood that different types of livestock may have different requirements for the temperature of the water.

Figure 2:
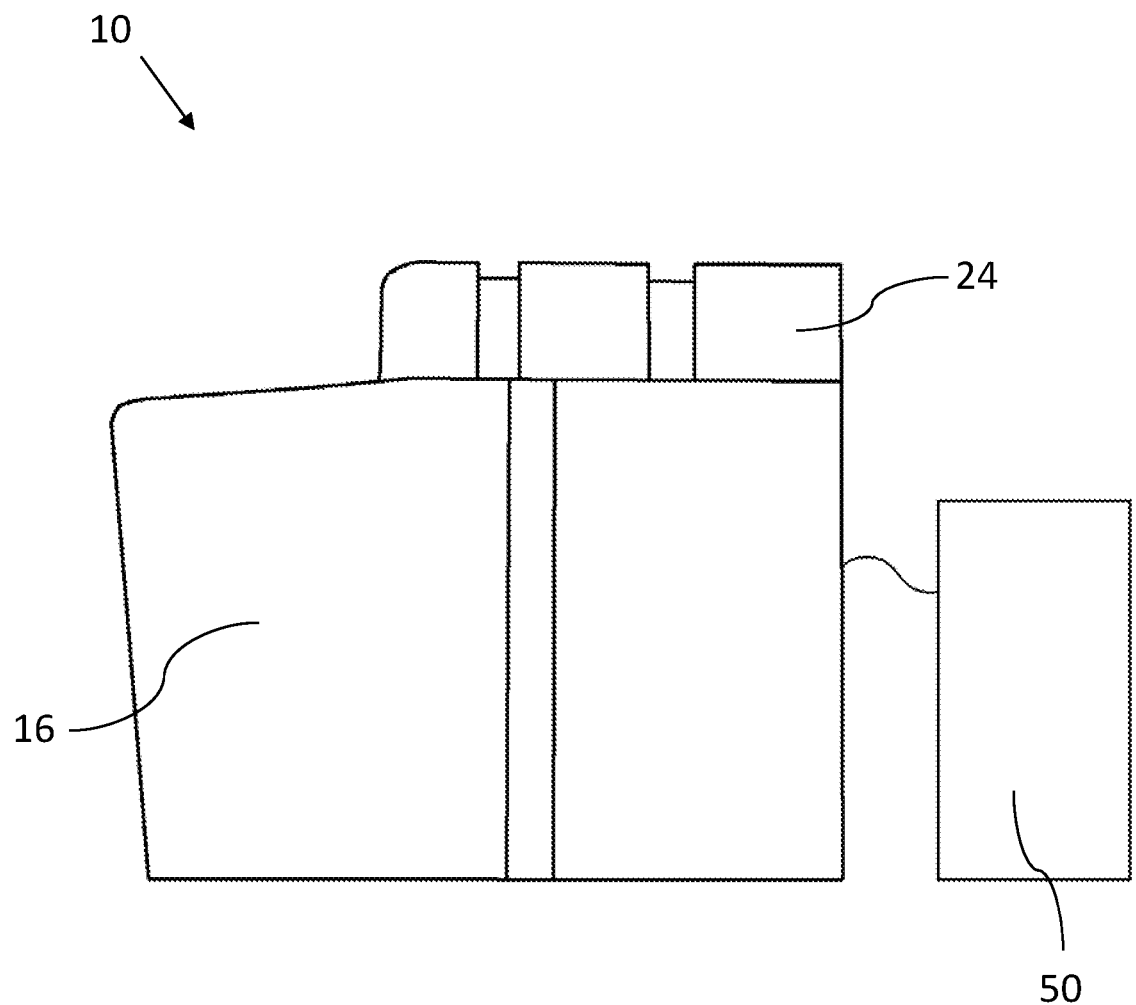
FIG. 2 is a side elevation view of the heated livestock waterer shown in FIG. 1 connected to a fuel tank.
Figure 4:
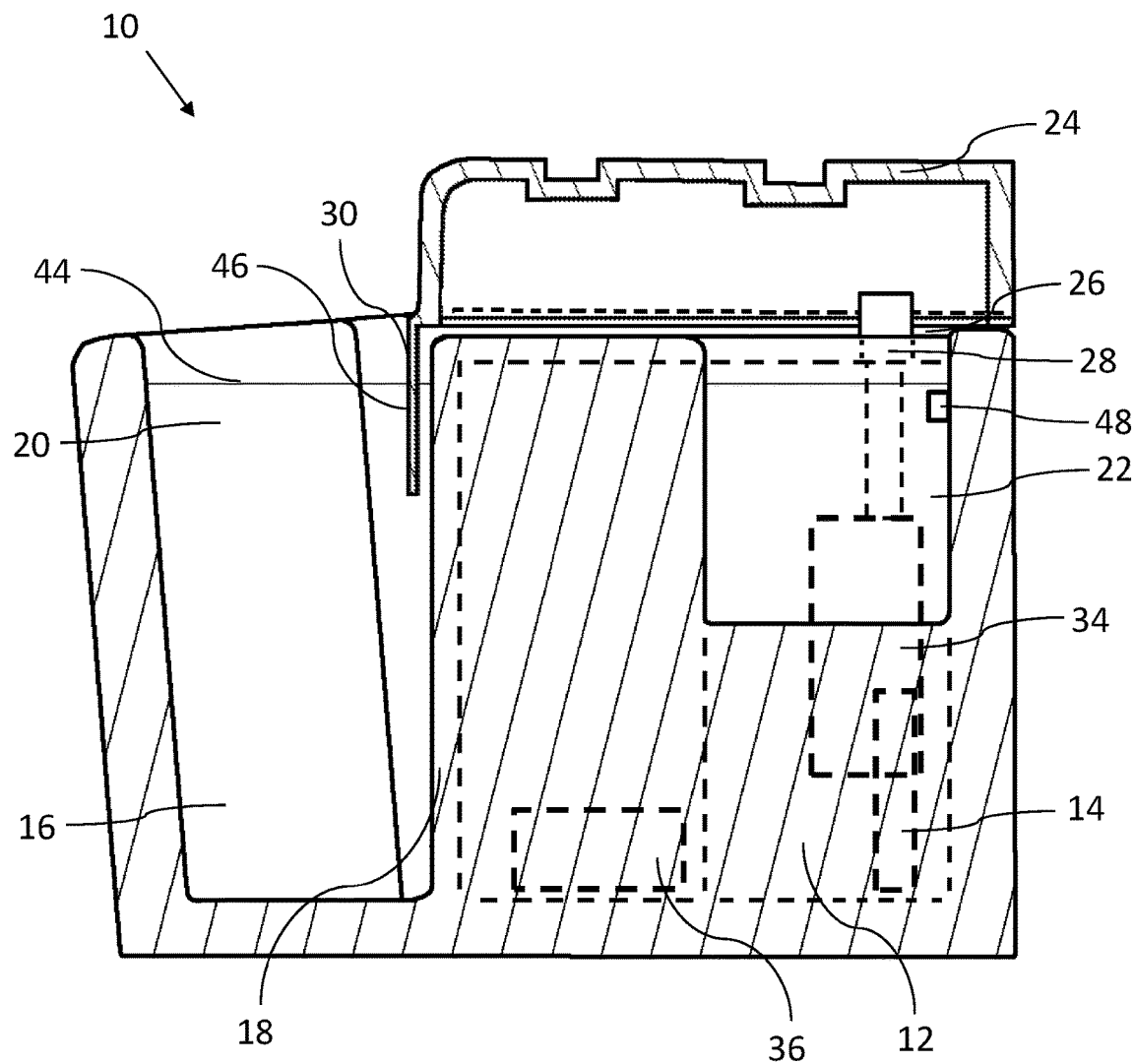
FIG. 4 is a side elevation view, in section, of the heated livestock waterer shown in FIG. 1, taken along the line A-A in FIG. 3.
Figure 6:
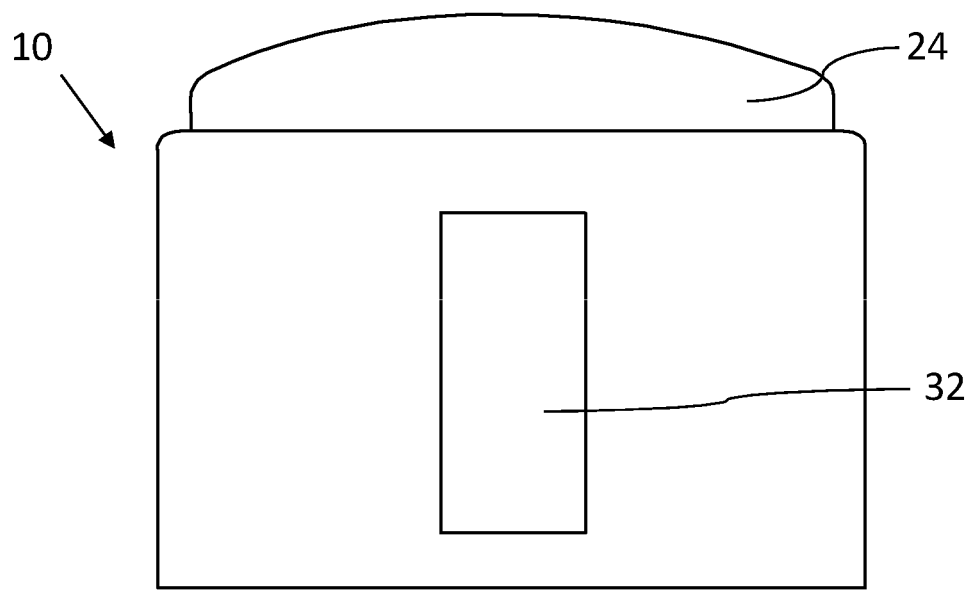
FIG. 6 is a rear elevation view of the heated livestock waterer shown in FIG. 1.

Referring to FIG. 4, heated livestock waterer 10 has a heater chamber 12. A heater 14 is disposed in heater chamber 12. In operation, heater 14 generates at least heated gas. Heater 14, may be, for example, a catalytic heater, which produces heat and an exhaust stream of water vapour and carbon dioxide. Heater 14 may have a power source provided within heater chamber 12, or a power source that is external to heater chamber 12. For example, as shown in FIG. 2, heater 14 may have a fuel tank 50 connected to heater 14. Fuel tank 50 may be connected through an opening in the walls of heated livestock waterer 10. Alternatively, fuel tank 50 may be connected through an air inlet 32 provided for heater chamber 12, allowing air to be supplied to heater 14 as well. FIG. 6 shows one example of an air inlet 32 for heater chamber 12. It will be understood that different shapes and positions for air inlet 32 may be used depending upon the application.

Figure 3:
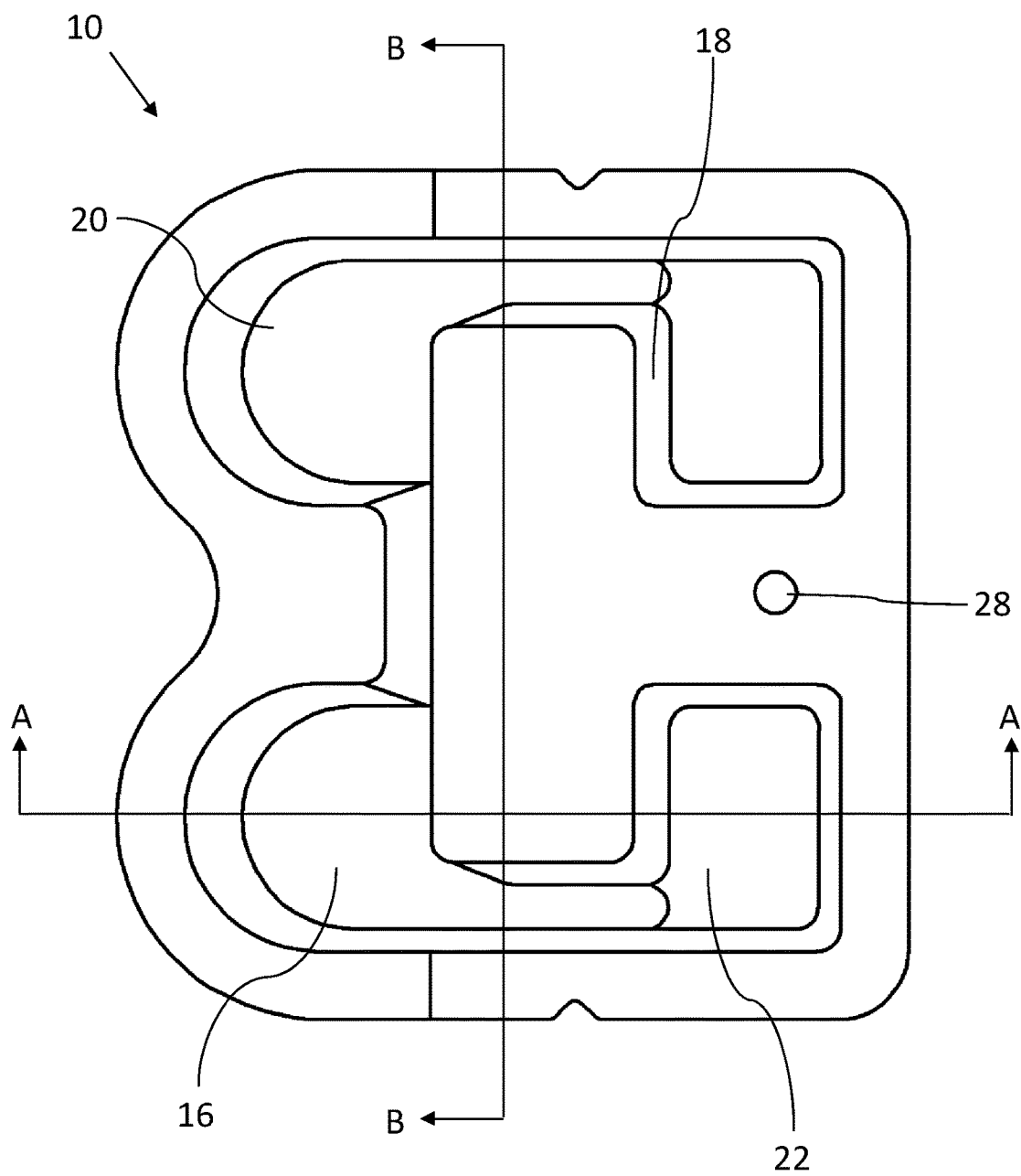
FIG. 3 is a top plan view of the heated livestock waterer shown in FIG. 1.

Referring to FIG. 4, water reservoir 16 has at least one sidewall 18 that is in thermal communication with heater chamber 12. Referring to FIG. 3 and FIG. 4, water reservoir 16 preferably has more than one sidewall in thermal communication with heater chamber 12 to increase the surface area available for thermal communication. As shown in FIG. 3, heater chamber 12 is positioned in the centre of water reservoir and has sidewalls on all four sides of the chamber in communication with water reservoir 16. As shown in FIG. 4, water reservoir 16 has an elevation change from front to back, allowing for the surface area under water reservoir 16 to be in communication with heater chamber 12 as well. Water reservoir 16 also has a water level 44. Depending on the application, and the requirements for heating livestock waterer 10, water reservoir 16 may also have a predetermined minimum or target water level, and may have a level sensor 48 for maintaining the predetermined water level. For example, when water level 44 dips below the predetermined water level, level sensor 48 may trigger an audible or visible alarm. Alternatively, level sensor 48 may transmit a signal to another device, such as controller for a valve on a hose, which refills water reservoir 16. Level sensor 48 may also transmit to a communication device, such as a computer or mobile phone, providing an alert that water reservoir 16 requires refilling. Other uses of level sensor 48 will be understood by those skilled in the art.

Figure 5:
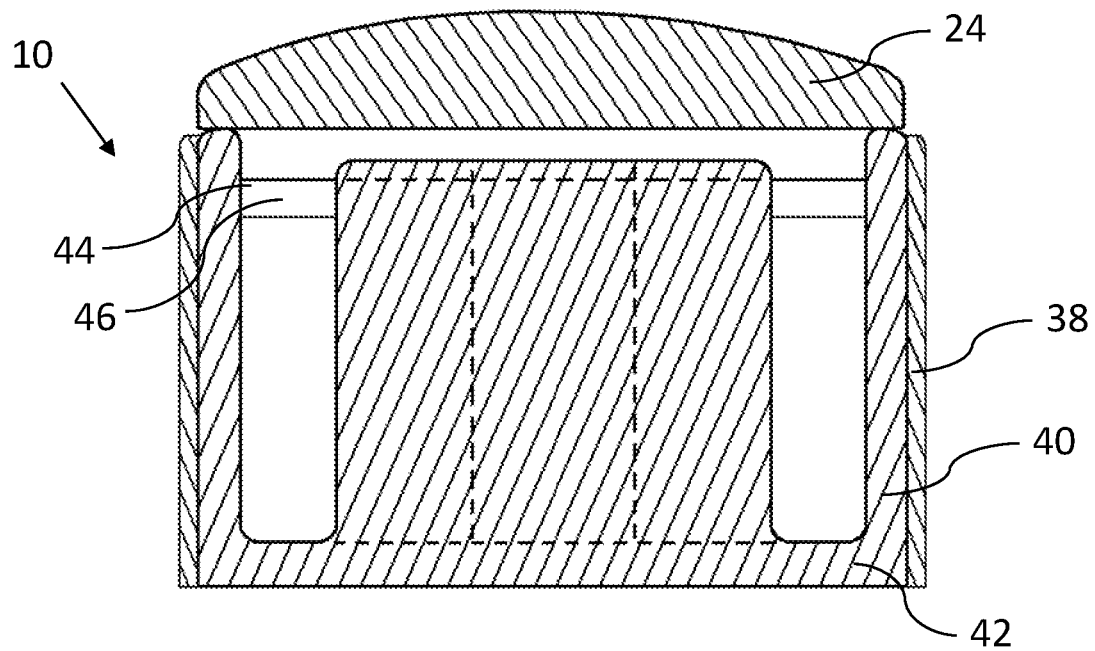
FIG. 5 is a rear elevation view, in section, of the heated livestock waterer shown in FIG. 1, taken along the line B-B in FIG. 3.

Referring to FIG. 3, water reservoir 16 has an animal watering section 20 and a covered section 22. Covered section 22 is covered by a lid 24 as shown in FIG. 2. Lid 24 may have a flange 46 as shown in FIG. 4 that extends below water level 44. Lid 24 may be hollow, may be a solid piece as shown in FIG. 5, or may be open to covered section 22 as shown in FIG. 4. Covered section 22 and lid 24 define an air space 26 that is in fluid communication with heater chamber 12 via an air passage 28. Depending on the type of heater 14, heater 14 may have an exhaust outlet that is directly connected to air passage 28. Heater 14 may also be covered by a vapour hood 34 as shown. When vapour hood 34 is used, vapour hood 34 is directly connected to air passage 28, and vapour hood 34 is positioned over heater 14 in order to collect the heated gas generated by heater 14. Air space 26 has a vent 30 to atmosphere. Vent 30 may be immediately adjacent to water level 44 of water reservoir 16. For example, vent 30 may be an open area around flange 46 as shown in FIG. 1. This may be preferable, as the warmer air exiting air space 26 around flange 46 may help to prevent the water in reservoir 16 from icing over. In operation, depending on the type of heater 14 and the configuration of heater chamber 12, the pressure of air space 26 may be greater than atmospheric pressure and the pressure of the heated gas generated by the heater in heater chamber 12 may be greater than the pressure of air space 26. In some circumstances it may be desired to provide a secondary heater 36 for heating heater chamber 12, as shown in FIG. 4. Secondary heater 36 may, for example, be an electric heater connected to a controller that turns on secondary heater 36 if the primary heater 14 stops heating heater chamber 12.

Figure 7:
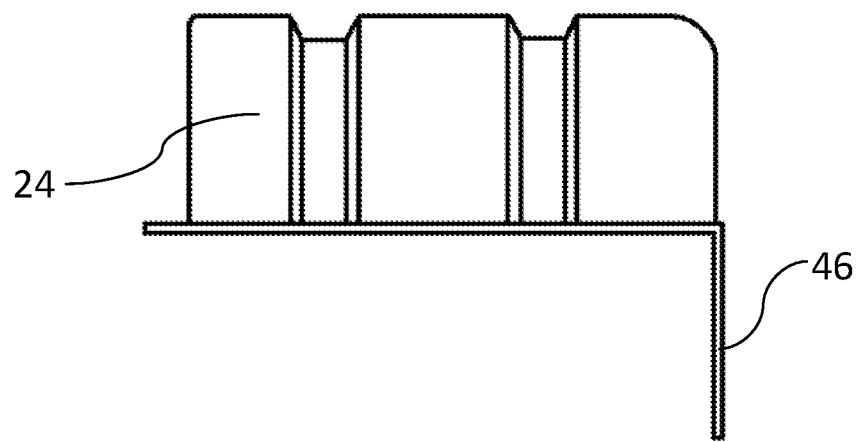
FIG. 7 is a side elevation view of the lid of the heated livestock waterer shown in FIG. 1.
Figure 8:
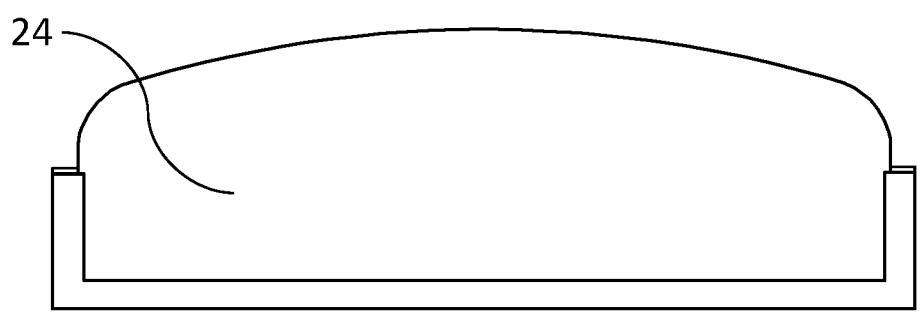
FIG. 8 is a rear elevation view of the lid of the heated livestock waterer shown in FIG. 1.

Referring to FIG. 5, water reservoir 16 may have a layer of insulation 38 on an outer wall 40, where outer wall 40 is separate from sidewall 18 that is between water reservoir 16 and heater chamber 12. For example, all of the outer walls 40 of heated livestock waterer 10 may have an exterior layer of insulation 38. Alternatively, outer walls 40 may have an embedded insulation later, or outer walls 40 may be formed from an insulating material. Lid 24 and base 42 may also be insulating. Referring to FIG. 7 and FIG. 8, lid 24 may take a variety of shapes and may have separate attachments, or attachments such as flange 46 may be integrally formed with lid 24.

Depending on the application, water reservoir 16 of heated livestock waterer 10 may be filled with water and heated livestock waterer 10 may be used as a regular livestock waterer when it is not required to provide heated water for livestock. When temperatures are such that heating of the water for the livestock is required, heater 14 may be activated. In the depicted example, heater 14 will heat heater chamber 12, and the at least one sidewall 18 of water reservoir 16 that is in thermal communication with heater chamber 12 will transfer heat to the water in water reservoir 16. This will generate thermal currents such that the water in water reservoir 16 will circulate throughout water reservoir 16, which will result in warmer water in animal watering section 20. Typically, the external environment will be cooling or freezing the water at the surface of animal watering section 20, as it is exposed, and ice tends to form at the water's surface. Due to the heated water in the proximity of sidewall 18 circulating throughout water reservoir 16, the heated water will tend to rise to the surface of heated livestock waterer 10 and counteract this freezing process. In addition, heater 14 produces a heated exhaust gas, such as water vapour and carbon dioxide in the case of a catalytic heater, and this heated gas may transfer heat to the at least one sidewall 18 that is in thermal communication with water reservoir 16. The heated gas will also tend to rise, and will exit heater chamber 12 through air passage 28. A vapour hood may also be provided to aid in collection of the heated gas to direct the heated gas into air passage 28. The heated gas then enters air space 26, where it is retained by lid 24. The heated gas exchanges further heat with the water in covered section 22 of water reservoir 16 while it is retained in air space 26. As well, when at least a portion of the heated gas is water vapour, the water vapour will tend to condense in air space 26 and be collected in water reservoir 16. As a product of a catalytic heater will be water, this water can be recycled back into water reservoir 16 and used for the livestock. Air space 26 has a vent 30 to atmosphere, through which the gas escapes. Vent 30 may be an opening in lid 24, or an opening around flange 46, as previously described. By providing a "leaky" lid that does not retain the heated gas completely, but rather, increases the amount of time that the heated gas spends in thermal communication with covered section 22 and the water in water reservoir 16, a flow path through heated livestock waterer 10 is established.

As discussed above, heater 14 may be a catalytic heater, and may have a fuel tank 50. The catalytic heating process produces both heated gas and heated water vapour that will also transfer heat to the water in water reservoir 16. When heater chamber 12 is provided with air inlet 32, the flow path will be as follows: fresh air will enter heater chamber 12, where the oxygen will react with the fuel, such as propane or natural gas, and will produce water vapour, heat, and carbon dioxide. The gas in the heater chamber, including the carbon dioxide, as well as the water vapour, will be heated by this reaction. The heated products may be collected by a vapour hood, and will flow through air passage 28 into air space 26, and finally out of vent 30 to atmosphere. Some portion of the water vapour may also condense in air space 26 and be collected in water reservoir 16. This flow path will be created by both the temperature and pressure changes in the system. Based on temperature, the heated gas will naturally be inclined to rise and exit air passage 28 and vent 30 to rise into the atmosphere. Based on pressure, due to the heating of the gas, the pressure of air space 26 will be greater than atmospheric pressure and the pressure of the heated gas generated by the heater in heater chamber 12 will be greater than the pressure of air space 26, and the gas will flow from the high pressure areas to the low pressure areas.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A heated livestock waterer comprising:
   a heater chamber;
   a heater disposed in the heater chamber that, in operation, generates at least heated gas; and
   a water reservoir having at least one sidewall that is in thermal communication with the heater chamber, the water reservoir having an animal watering section and a covered section covered by a lid, the lid and the covered section defining an air space that is in fluid communication with the heater chamber via an air passage, the air space having a vent to atmosphere.

2. The heated livestock waterer of claim 1, wherein the heater is a catalytic heater and the heater chamber further comprises an air inlet.

3. The heated livestock waterer of claim 2, further comprising a vapour hood that is directly connected to the air passage of the heater chamber, the vapour hood being positioned to collect the heated gas generated by the heater.

4. The heated livestock waterer of claim 2, further comprising a secondary heater for heating the heater chamber.

5. The heated livestock waterer of claim 1, wherein the water reservoir has a layer of insulation on an outer wall, the outer wall being separate from the at least one sidewall in thermal communication with the heater chamber.

6. The heated livestock waterer of claim 1, wherein, in operation, the pressure of the air space is greater than atmospheric pressure and the pressure of the heated gas generated by the heater is greater than the pressure of the air space.

7. The heated livestock waterer of claim 1, wherein the vent is immediately adjacent to a water level of the water reservoir.

8. The heated livestock waterer of claim 1, wherein the water reservoir has a predetermined water level and further comprises a level sensor for maintaining the predetermined water level.

9. The heated livestock waterer of claim 1, wherein at least a portion of the heated gas comprises water vapour, and wherein any water vapour that condenses in the air space is collected in the water reservoir.

10. A method of heating water for livestock, the method comprising:
    providing a heated livestock waterer comprising:
      a heater chamber;
      a heater disposed in the heater chamber; and
      a water reservoir having at least one sidewall that is in thermal communication with the heater chamber, the water reservoir having an animal watering section and a covered section covered by a lid, the lid and the covered section defining an air space that is in fluid communication with the heater chamber via an air passage, the air space having a vent to atmosphere;
    filling the water reservoir with water; and
    operating the heater to heat the at least one sidewall that is in thermal communication with the water reservoir, and to generate a heated gas that exits the heater chamber through the air passage and enters the air space, the heated gas exchanging heat with the water in the water reservoir.

11. The method of claim 10, wherein the heater is a catalytic heater and the heater chamber further comprises an air inlet.

12. The method of claim 11, wherein the heated livestock waterer further comprises a vapour hood that is directly connected to the air passage of the heater chamber, and wherein the vapour hood collects the heated gas generated by the heater.

13. The method of claim 11, wherein the heated livestock waterer further comprises a secondary heater for heating the heater chamber.

14. The method of claim 10, wherein the water reservoir has a layer of insulation on an outer wall, the outer wall being separate from the at least one sidewall in thermal communication with the heater chamber.

15. The method of claim 10, wherein, in operation, the pressure of the air space is greater than atmospheric pressure and the pressure of the heated gas generated by the heater is greater than the pressure of the air space.

16. The method of claim 10, wherein the vent is immediately adjacent to a water level of the water reservoir.

17. The method of claim 10, wherein the water reservoir has a predetermined water level and further comprises a level sensor for maintaining the predetermined water level.

18. The method of claim 10, wherein at least a portion of the heated gas comprises water vapour, and wherein any water vapour that condenses in the air space is collected in the water reservoir.

* * * * *